United States Patent
de Cadenet

[15] 3,693,245
[45] Sept. 26, 1972

[54] WELDED DEPOSITS FOR AUSTENITIC STEELS

[72] Inventor: Jean-Jacques de Cadenet, Les Charmettes (73), Ugine, France

[22] Filed: Feb. 24, 1970

[21] Appl. No.: 13,757

Related U.S. Application Data

[63] Continuation-in-part of Ser. No. 608,971, Jan. 13, 1967, abandoned.

[30] Foreign Application Priority Data

Jan. 13, 1966 France..................6645725

[52] U.S. Cl..................................29/504
[51] Int. Cl..................B23k 31/02, B23k 35/24
[58] Field of Search..................................29/504

[56] References Cited

UNITED STATES PATENTS 3,365,789  1/1968  Brown..................29/504 X

OTHER PUBLICATIONS

Welding Handbook, 1942 Edition, page 815.

*Primary Examiner*—John F. Campbell
*Assistant Examiner*—Ronald J. Shore
*Attorney*—Webb, Burden, Robinson & Webb

[57] ABSTRACT

Weld deposits joining nickel-chrome austenitic steels, a method of making the weld deposits and filler metals yielding such weld deposits which have the general composition in per cent by weight of carbon 0.06 to 0.12, chromium 15 to 20, nickel 7.5 to 13, tungsten 3.5 to 5, manganese 0.5 to 2, silicon 0.6 and nitrogen ($N_2$) 0.10, and a ferritic tendency index of less than or equal to 15.

1 Claim, No Drawings

WELDED DEPOSITS FOR AUSTENITIC STEELS

This application is a continuation-in-part of my application Ser. No. 608,971, filed Jan. 13, 1967 and now abandoned.

The present invention relates to weld deposits and methods of making weld deposits. More particularly, it relates to fillers and weld deposits adapted for joining austenitic steels resistant to high temperatures and specifically nickel-chrome austenitic steels and steels derived therefrom by the addition of alloying elements.

When steels resistant to high temperature are joined by welding, the applicable requirements are that the welded deposits should be unaffected by fissuration during welding, they should not become embrittled during an extended period of high temperature application, and they should have creep characteristics comparable to those of the base metal.

Weld deposits of the present invention meet these requirements and provide a weld joint having superior properties to those utilizing weld deposits containing molybdenum which are currently used for welding austenitic steels for high temperature applications.

The weld deposits and filler metals encompassed within the scope of the present invention are substantially nickel-chrome austenitic steels having the following general composition:

| | |
|---|---|
| Carbon | 0.06 to 0.12 % |
| Chromium | 15 to 20 % |
| Nickel | 7.5 to 13 % |
| Tungsten | 3.5 to 5 % |
| Manganese | 0.5 to 2 % |
| Silicon | ≤ 0.6 % |
| Nitrogen | ≤ 0.10 % |

The balance is iron and the normal impurities in steel. The index of ferritic tendency represented by the formula, $3(Cr + 0.5 W + 1.5 Si - 0.93 Ni - 28 C - 0.46 Mn - 15 N_2 - 6.7)$, in which the symbols of the elements represent the proportions expressed in per cent by weight, is equal to or less than 15.

The preferred composition for weld deposits and filler metals within the scope of this invention is within the following more restricted limits:

| | |
|---|---|
| Carbon | 0.06 to 0.10 % |
| Chromium | 15 to 17.5 % |
| Nickel | 7.5 to 9 % |
| Tungsten | 3.5 to 4.5 % |
| Manganese | 0.5 to 2 % |
| Silicon | ≤ 0.6 % |
| Nitrogen | ≤ 0.10 % |

The balance is iron and incidental impurities. This steel has an index of ferritic propensity less than 8.

The present invention encompasses the components or aggregates which comprise such deposits and filler metals which make it possible to make the weld deposits within the ranges set forth above. As used herein, the term filler metal includes metal wires or rods, having the composition set forth above, which may be used under gaseous protection, under a flux or under an electrically conductive slag to produce weld deposits having the composition set forth above. It includes coated electrodes or the tubular filler metals in which the metal core has the composition of the invention and coated electrodes or the tubular filler metals in which the metal core has a different composition from that of the invention, but in which the coating or filling has a composition such that the metal deposited by welding has the composition of the invention. It also includes any combination between a metal electrode of optional composition and a protective flux or electroconductive slag in which the compositions are such that the metal deposited by welding utilizing the combination has the composition set forth above. And, in general, it includes any combination of compact or pulverulent substances which may be used as an initial welding product that will allow one to obtain a deposited metal having the compositions set forth above. For ease of presentation, this general class of materials described hereinabove will be referred to as "filler metal bodies."

Tests have been made comparing the mechanical strength of welded joints made utilizing weld deposits currently used for welding austenitic steels for high temperature and joints made utilizing weld deposits and filler metal bodies within the scope of this invention.

The method of welding the pieces of austenitic nickel-chrome steels comprises welding the pieces in the presence of a filler metal body to form the weld deposit. The weld deposit has a composition of 0.06 to 0.12 per cent carbon, 15 to 20 per cent chromium, 7.5 to 13 per cent nickel, 3.5 to 5.0 per cent tungsten, 0.5 to 2.0 per cent manganese, up to 0.6 per cent silicon, up to 0.10 per cent nitrogen and the balance iron and incidental impurities. In Table I below, the results of rupture through creepage tests are tabulated. Weld deposit A was a typical molybdenum type deposit containing 0.08 per cent carbon, 16 per cent chrome, 8 per cent nickel, 20 per cent molybdenum and the balance iron and incidental impurities. Weld deposit b had a composition within the preferred range of this invention.

TABLE I

| | Weld Deposit | after 100 hrs. | after 1,000 hrs. | after 10,000 hrs. |
|---|---|---|---|---|
| Creep rupture strength kg/mm² | at 650°C A | 21.8 | 18 | 14 |
| | B | 23 | 19.5 | 15 |
| | at 700°C A | 16.5 | 12 | 8.5 |
| | B | 18 | 14.2 | 10.7 |

The improvement achieved by the weld deposits of this invention (B) compared with prior art deposit (A) is on the order of 5 per cent at 650° C. At 700° C. at the end of 100 hours the improvement in breaking strain has increased to 9 per cent, after 1,000 hours to 18 per cent, and at the end of 10,000 hours to more than 20 per cent.

The test also showed that at 700° C, under a given stress for a period of time exceeding 100 hours, breakage as the result of creepage occurs at the end of a period of time that is three times longer in the case of the weld deposits of the present invention than in the case of weld deposits of the prior art.

The substantially austenitic welds containing chromium and nickel, with additions, such as molybdenum and columbium, may become embrittled in service by the formation of intermetallic compounds of the sigma phase type in their structure. This formation may be spread over several thousand hours and may considerably reduce the ductility and resiliency of the welds.

On the other hand, weld deposits of this invention in which the composition lies within the preferred limits specified, and in which the ferritic propensity lies between 0 and 8, have very little tendency to form the sigma phase. The ageing of these new welded deposits at high temperature is principally caused by the formation of complex carbides containing chromium and tungsten, in particular. This results in a much less substantial drop in ductility than that resulting from the formation of the sigma phase. Moreover, this drop in ductility is rapidly followed by a partial restoration of the properties of the metal. This has been established by the results of tests made on metal deposited by welding, having the composition of 15.6 per cent chromium, 8 per cent nickel, 3.5 per cent tungsten, 0.06 per cent carbon, 1.6 per cent manganese, 0.15 per cent silicon, 0.05 per cent nitrogen, and the balance iron and incidental impurities. The results are set forth in Table II which gives the UF resiliency of the metal.

TABLE II

| | UF Resiliency (kgm/cm$^2$) |
|---|---|
| Weld metal (as welded) | 13.4 – 11.9 – 13.4 |
| Weld-Metal Held at 750°C for 300 hours | 6.9 – 5.9 – 5.7 |
| Weld-Metal Held at 750°C for 1000 hours | 8.3 – 7.7 – 7.5 |

The weld deposits of this invention also have a greatly improved resistance to oxidation in air up to 800° C. Two specimens were maintained in air at 800° C for 200 hours. Both specimens contained 0.09 per cent carbon, 18 per cent chromium, 13 per cent nickel, 1.5 per cent manganese, 0.50 per cent silicon, and 0.06 per cent nitrogen. The balance was iron and incidental impurities (including 0.5 per cent titanium) except that the first specimen contained 2 per cent molybdenum and the second specimen had 3.5 per cent tungsten. The increase in weight per unit surface area of the specimen indicated that the degree of oxidation was 1.5 times greater for the specimen containing molybdenum than for the specimen having a composition within the scope of this invention.

These welded deposits, according to the invention, are particularly appropriate for welding plants such as furnaces or power generation plants operating at high temperature.

From the foregoing it is apparent that this invention provides a novel weld deposit and a method of making it particularly adapted for joining nickel-chrome austenitic steels resistant to high temperatures which results in joints having improved mechanical strength, better ductility and more resistance to oxidation than weld deposits used heretofore.

While the preferred embodiments of this invention have been described, it may be otherwise embodied within the scope of the appended claims.

I claim:

1. A method of joining pieces of standard austenitic nickel-chrome steels by welding comprising fusing under standard protective conditions a filler metal body between said pieces to form a weld deposit, said filler metal body including a composition of and said weld deposit consisting essentially of 0.06 to 0.12 per cent carbon, 15 to 20 per cent chromium, 7.5 to 13 per cent nickel, 3.5 to 5.0 per cent tungsten, 0.5 to 2.0 per cent manganese, up to 0.6 per cent silicon, up to 0.10 per cent nitrogen, and the balance iron and incidental impurities.

* * * * *

UNITED STATES PATENT OFFICE
CERTIFICATE OF CORRECTION

Patent No. 3,693,245      Dated September 26, 1972

Inventor(s) Jean-Jacques deCadenet

It is certified that error appears in the above-identified patent and that said Letters Patent are hereby corrected as shown below:

Column 2 Line 33 --20 per cent--
        should read --2.0 per cent--.

Signed and sealed this 6th day of March 1973.

(SEAL)
Attest:

EDWARD M. FLETCHER, JR.          ROBERT GOTTSCHALK
Attesting Officer                  Commissioner of Patents